United States Patent [19]

Squier et al.

[11] Patent Number: 4,835,030
[45] Date of Patent: May 30, 1989

[54] IN SITU PATTERN MOLDING AND ADHESION OF PVC HEEL PAD BLANKS TO AUTOMOTIVE CARPETING WITHOUT DIELECTRIC MEANS

[75] Inventors: William H. Squier; Dennis E. Hair, both of Carlisle, Pa.

[73] Assignee: C. H. Masland & Sons, Carlisle, Pa.

[21] Appl. No.: 108,007

[22] Filed: Oct. 14, 1987

[51] Int. Cl.⁴ .................. B32B 3/02; B32B 33/00
[52] U.S. Cl. ........................ 428/88; 428/95; 428/96; 428/97; 156/242; 156/245; 156/246; 264/257; 264/259
[58] Field of Search .............. 428/88, 95, 96, 97; 156/242, 245, 246; 264/257, 259

[56] References Cited

U.S. PATENT DOCUMENTS

| | | | |
|---|---|---|---|
| 2,796,634 | 6/1957 | Chellis | 18/56 |
| 3,042,564 | 7/1962 | Hankins | 156/242 |
| 3,133,980 | 5/1964 | Hankins | 264/257 |
| 3,388,018 | 6/1968 | Squier et al. | 156/242 |
| 3,708,434 | 11/1972 | Channock et al. | 156/272 |
| 3,713,936 | 1/1973 | Ramsay, Jr. | 156/242 |
| 4,177,311 | 12/1979 | Smith et al. | 428/246 |
| 4,241,131 | 12/1980 | Bailey | 428/262 |
| 4,491,556 | 1/1985 | Fujii et al. | 264/243 |

FOREIGN PATENT DOCUMENTS 721665 11/1965 Canada .
805236 12/1958 United Kingdom .

Primary Examiner—Marion C. McCamish
Attorney, Agent, or Firm—Nixon & Vanderhye

[57] ABSTRACT

A process for applying a PVC heel pad to automotive carpeting to eliminate the necessity of pre-forming the heel pads before they are applied to the carpet and the products formed thereby, including the steps of applying a hot melt adhesive composition between the carpet and the back side of an unpatterned PVC sheet; positioning the composite which includes the carpet, adhesive and unpatterned PVC sheet in a metallic heel pad patterned mold; and forming in situ a pattern molding on the PVC pad simultaneously with the adhesion of the PVC pad to the carpet.

35 Claims, 3 Drawing Sheets

IN SITU PATTERN MOLDING AND ADHESION OF PVC HEEL PAD BLANKS TO AUTOMOTIVE CARPETING WITHOUT DIELECTRIC MEANS

FIELD OF THE INVENTION

The present invention generally relates to methods of affixing heel pads to automotive carpeting and the molding of plastic components to automobile mats and interior carpeting. More particularly, the invention relates to an improved process for applying a heel pad comprised of polyvinyl chloride (PVC) or like materials to automotive carpeting using a hot melt adhesive composition which results in the simultaneous adhesion of the heel pad and the formation of a design pattern on the exterior (exposed) surface of the pad during the adhesion step, thereby eliminating the necessity for using conventional dielectric means to form the heel pad pattern. The present invention also eliminates any need to pre-form heel pads before they are applied to the carpeting and the separate step of gluing the pre-patterned heel pad to the carpet.

BACKGROUND AND SUMMARY OF THE INVENTION

Automobile mats used for covering the flooring of an automobile are typically molded, laminated products composed of a tufted carpet having a padding of thermoplastic material laminated to the back surface. Either prior to or after the carpet has been molded to conform to the interior of the automobile, plastic or rubberized components are bonded to the carpet to form the "heel pads" and other wear portions of the floor mats, transmission tunnel and areas of the carpet which undergo the most wear during use.

In the past, a number of conventional methods for laminating a PVC heel pad to the carpet have been used on a commercial basis, and many prior art methods have attempted to achieve three principal objectives--first, to provide a secure and uniform bond between the carpet or floor mat and the entire surface area of the heel pad in contact with the carpet, including the edges; second, to affix the heel pad in such a manner that the edges remain trimmed and aesthetically appealing following adhesion to the carpet; and third, to provide a heel pad having sufficient abrasion and scuff resistance to ensure that the pad will last at least as long as the carpet itself.

One well known process for applying heel pads to automobile carpets is the so-called "dielectric" method which permanently bonds polyvinyl chloride pads to the carpet while simultaneously forming the design pattern. The dielectric process uses short wave radio waves (microwaves) to increase the molecular activity of a PVC blank in a conventional pattern mold such that the collision frequency between molecules causes an increase in the heat of friction, which in turn causes the PVC to plasticize and adhere to the carpet fibers while forming a design pattern on the opposite surface. One advantage of the dielectric process is that it accomplishes the required adhesion without substantially increasing the heat o the metal pattern mold used to apply the PVC heel pad and form the desired pattern.

The dielectric process does not require the use of any adhesive composition, hot melt or otherwise, and has proven to be a commercially viable laminating technique. However, the process has a number of distinct disadvantages. First, because of the relatively complex and expensive equipment required, such processes have extremely high maintenance costs (requiring, in applicant's case, over $30,000 dollars a year in routine plant maintenance and repairs). Generally, the entire dielectric operation must be shut down for both periodic and routine scheduled repairs, resulting in 2 to 3 days downtime for the equipment involved. The dielectric process is also high in operating costs because it consumes electrical energy at a relatively high rate.

Preferably, the dielectric process is carried out on a flat carpet (although it has been employed with premolded carpets). In such applications, a separate molding operation is required which may involve a series of additional processing steps. For example, a flat carpet which already has the heel pad affixed to one portion will invariably require reheating before the carpet can be molded for installation in the automobile. During such subsequent molding operations, the carpet backing (generally consisting of a thermoplastic material) plasticizes causing the position of the molded carpet to shift relative to the backing as much as ½ inch. This tendency to "drift" during the subsequent heating and molding process can result in a variance in the position of the previously-applied heel pad on the molded carpet and thereby cause quality assurance problems in the final end product.

A further disadvantage of conventional dielectric processes concerns the arcing which may result from the use of radio wave heating elements. For example, virtually any amount of metal present in either the carpet or the heel pad will tend to arc during the dielectric heating process and burn the heel pad thereby ruining the carpet. Even pigments, dyes and plasticizers with traces of metal or metallic salts in the carpet may cause arcing and result in unscheduled repair and maintenance costs. Also, any residual traces of premetallized acid dyes (normally used in the manufacture of automotive carpeting) to achieve good fastness to ultra-violet light may cause such arcing. Again, the above problems may result in quality control problems with the end-product molded carpet.

A known alternative to the dielectric process is the use of hot melt adhesives, commonly referred to as "thermoplastic resins" or "thermoplastic adhesives" to affix backings and reinforcements to the automotive carpet. Hot melt adhesives are well known for their ability to form a rapid bond during the lamination of, for example, padding or a thermoplastic material to the back surface of the carpet.

Heretofore it has also been known that hot melt adhesives, including polyamides and polyester resins, could be used to apply polyvinyl chloride heel pads to carpeting. However, conventional processes using such adhesives require preformed, prepatterned PVC heel pads having thicknesses measuring about 40 millimeters. Such adhesives have not been used for purposes of adhesively bonding an unpatterned blank pad to the carpet and simultaneously forming a design pattern on the exterior surface of the pad.

One known conventional process for applying a PVC heel pad to carpeting utilizes an adhesive compound applied to only portions of the PVC pad (e.g., the edges or other areas, depending on the automobile manufacturer's requirements) using a relatively thick prepatterned pad, i.e., a pad which has a design pattern already embossed on the exterior surface. A number of problems exist with such a lamination technique, including higher cost due to the pre-molding operation for the pad to form the desired pattern, the lack of adhesion due to the fact that a uniform layer of adhesive is not applied to the entire pad (thereby making the bond between the pad and carpet non-uniform in certain areas), and the difficulties encountered in ensuring that the adhesive applied to the pad does not flow under the edges of the pad and into the carpet or does not flow completely to the edge, thereby leaving a portion of the edge unglued.

A third known method for applying a heel pad to tufted carpet requires that the pad be pre-formed and thereafter sewn directly to the carpet, with or without adhesive bonding to one or more portions of the pad. The disadvantages of such method are the time and cost to prepattern the pads, the cost to perform the subsequent sewing and bonding operations, the non-uniformity of the carpet/pad bond and the generally shorter wear life expectancy for sewn, as opposed to fully laminated articles.

Within the automotive industry, all of the above prior art methods have typically used polyvinyl chloride unpatterned blanks or prepatterned PVC pads having thicknesses in the range of 30-50 millimeters, depending on the desired application and the automobile manufacturer's standard for interior carpeting. These conventional heel pad thicknesses have been necessary for two reasons. First, a minimum pad thickness is essential to allow for acceptable thermal flow design pattern formation during the dielectric process. Second, the minimum prescribed thickness ensures that the pads will have the required abrasion and scuff resistance over a sufficiently long period of time. Typically, however, in order to reduce the cost of such pads, they are manufactured with heavy concentrations of filler materials such as calcium carbonate, a material which actually reduces the scuff and abrasion resistance of unfilled polyvinyl chloride.

It has now been found that many of the above problems relating to the prior art dielectric process and the deficiencies of the hot melt adhesive applications can be solved by the process and products according to the present invention. In particular, it has now been found that an adhesive may be applied to the total area of an unpatterned blank (as opposed to a pre-molded and pre-patterned) PVC heel pad to automotive carpeting to simultaneously form a design configuration or pattern on the blank pad during a single bonding and molding operation. Thus, the lamination process according to the invention entirely eliminates the need for pre-molded (pre-patterned) heel pads.

The process according to the present invention includes the following basic steps:

(a) placing an unpatterned pre-cut PVC heel pad onto the face of a conventional pattern mold;

(b) depositing a uniform layer of liquid hot melt adhesive to the exposed surface of the unpatterned flat heel pad (preferably in an amount equal to approximately 8 ounces per square yard), with the liquid hot melt adhesive being formable into a coherent solid layer upon fusion and solidification during cooling;

(c) immediately contacting the tufted or fibrous surface portion of an automotive carpet to the hot melt adhesive; and (d) applying uniform pressure to the mold, unpatterned heel pad and automotive carpeting to adhesively bond the heel pad to the carpet and simultaneously form, in situ, a patterned heel pad.

Surprisingly and unexpectedly, the method according to the present invention has a number of distinct advantages over conventional pattern molding operations. First, as discussed above, the simultaneous molding and adhesion of the PVC pad during the hot melt application eliminates the need for utilizing pre-formed heel pads, i.e., pads having design patterns already imprinted on the exterior surface. Second, it has been found that the use of hot melt adhesives in prescribed amount and within certain temperature ranges permits the design to form on PVC heel pad blanks having thicknesses well below conventional 40 millimeter pads during the single lamination step. For example, PVC thicknesses as low a 7 millimeters have been found to be acceptable. Despite the reduced thickness of heel pads in accordance with the invention, they have been found to exhibit improved wear and scuff resistance (due primarily to the absence of high concentrations of filler materials used in conventional heel pads, e.g., up to 30% by weight).

It has also been found that the method and products according to the present invention may be used with an entirely new and unexpected category of carpets. It is well known in the automotive carpet industry that nylon face fiber carpets will bond effectively to PVC materials such as heel pads using conventional dielectric means. However, polypropylene face fiber products will not bond effectively to PVC pads using dielectric means without special costly pretreatments or costly modifications to the process because of the absence of polar groups in the polypropylene fibers. Thus, to date, almost 100% of the carpet face fibers used in molded automotive floor coverings are composed of Nylon 66 or polymerized polyhexamethylene adipimide using dielectric means to bond the heel pad to the carpet. The current industry trend is to improve ultra violet light fastness while reducing the cost of fibers. As a result, recent efforts within the industry have focused on replacing BCF nylon with polypropylene because the latter is capable of solution (pigment) dyeing which produces superior light fastness to conventionally dyed nylon. Polypropylene is also lower in cost than nylon.

Surprisingly, the hot melt adhesive method in accordance with the present invention is effective in simultaneously pattern forming and bonding PVC heel pads to polypropylene. Thus, the present method offers an improved design/bonding lamination method for polypropylene carpets which cannot be readily duplicated by currently available dielectric processes.

Although the exact mechanism for forming a design on the PVC blank pad is not known, applicants believe that when the hot melt adhesive comes in contact with the surface to be bonded—in this case the coated side of the PVC vinyl sheet—a high degree of wetting of the hot melt coating and the surface material occurs as the two components (PVC and adhesive) make contact. The adhesive immediately transfers heat to the PVC under the coating and, to a limited extent, to the processing environment on the other side of the coating until an equilibrium temperature is attained. Within seconds, however, the high temperature differential driving force causes the thin PVC to reach a high enough temperature to undergo permanent deformation. In that regard, Table I is exemplary of the relationship of temperature and elapsed time after applying the hot melt adhesive to the PVC in accordance with the invention.

TABLE I

RELATIONSHIP OF PVC TEMPERATURE VS. ELAPSED TIME

| TIME (SEC.) | TEMP. NO. 1 (°F.) | TEMP. NO. 2 (°F.) (RECHECK) |
|---|---|---|
| 5[1] | 366 | 364 |
| 10 | 358 | 360 |
| 15 | 342 | 351 |
| 20 | 327 | 344 |
| 25 | 316 | 333 |
| 30 | 305 | 311 |
| 35 | 294 | 289 |
| 40 | 283 | 287 |
| 45 | 271 | 268 |
| 50 | 261 | 258 |
| 55 | 250 | 243 |

Notes:
[1] The hot melt adhesive was sprayed onto the PVC for 5 seconds. The first and second (recheck) temperature readings of the PVC were then taken immediately thereafter.

As the mold is closed and pressure applied to the PCV/adhesive/carpet combination, the mold design configuration is permanently embossed on the PVC sheet. Typically, the total elapsed time from application of the adhesive to full compression and molding falls in the range of between 10–15 seconds.

Another advantage of the process according to the present invention is that it offers significant cost savings over prior art methods for adhering PVC pads to automotive carpets which require dielectric means.

The present simultaneous adhesive/design molding lamination technique also utilizes a significantly thinner PVC blank (generally in the range of 12 millimeters or less) and forms, in situ, a composite structure wherein the thin PVC forms a protective cover adhesively bonded to a layer of compressed fiber tufts in the carpet which have become saturated (impregnated) with the liquid hot melt adhesive. Upon cooling and compression, the adhesive-soaked fibers form the same design configuration as the vinyl covering and the pattern mold used during the process, thus completing a matrix or composite superior in performance and appearance but with substantially lower raw material and operating costs.

In its final state, the resultant pad defines a unitary, composite structure with the PVC surface having improved scuff and abrasion resistance as compared to conventional pads with thicknesses in the range of 30–50 millimeters. One reason for such improved wear characteristics is the fact that the thinner PVC blanks do not require any high concentration of fillers, such as calcium carbonate, which tend to reduce the abrasion and scuff resistance of conventional heel pads.

One further advantage of the present invention is that the heel pad location may be more accurately controlled than with conventional dielectric processes. Typically, dielectric methods of applying heel pads to unmolded carpets must allow for about one-fourth to one-half inch variation in pad location, with the best results being about 5–6 mm tolerance on flat carpet. In contrast, hot melt laminations in accordance with the present invention allow the heel pads to be applied to pre-molded (as opposed to flat) carpet and thus provide control within tolerance of about 3–4 mm. Such improved quality assurance applies both to heel pads affixed to the flooring area of the automotive carpet and those located partially on contoured sections such as, for example, up the transmission tunnel.

Thus, it is an object of the present invention to provide for an improved and more cost effective method for applying a PVC heel pad to automotive carpeting without requiring dielectric means.

It is a further object of the present invention to provide a novel heel pad which has improved wear characteristics and which eliminates unsightly "scuff" marks which occur with the use of conventional heel pads requiring high concentrations of filler materials.

It is still a further object of the present invention to provide for a simultaneous adhesive/design molding lamination method wherein polyvinyl chloride heel pads may be bonded to polypropylene carpet.

It is still a further object of the present invention to eliminate the necessity of pre-forming a heel pad applied to carpeting during the hot melt lamination.

It is still a further object of the present invention to provide an improved laminated carpet product having a heel pad adhesively applied in accordance with the invention.

It is still a fur&her object of the present invention to form an in situ pattern molding on the PVC pad simultaneously with the adhesion of the hot melt adhesive to the carpet and back side of the PVC sheet.

These and other objects of the invention will become more clear following consideration of the detailed description and appended drawings.

INFORMATION DISCLOSURE STATEMENT

Attention is directed to the publications discussed below as examples of possibly relevant prior art and for purposes of providing a better understanding of the invention claimed herein.

Typical disclosures regarding molding operations for articles comprising a substrate and vinyl material and the processes for adhesively bonding vinyl material to carpet are shown by the following patents: U.S. Pat. Nos. 4,491,556 to Fuji et al; 4,241,131 to Bailey; 4,177,311 to Smith et al; 3,713,936 to Ramsay; 3,703,424 to Charnock et al; 3,388,018 to Squier et al; 3,133,980 to Hankins; 3,042,564 to Hankins; 2,796,634 to Chellis; Canadian Patent No. 721,665 to Niceley et al; and British Patent No. 805,236.

The '018 patent to Squier et al discloses a process for adhesively bonding a pre-molded vinyl material to the carpet. The lower surface of the vinyl is heated to a temperature sufficient to make the vinyl material molten, withdrawing heat from the lower portion to thereby "commence gellation or solidification" while heating the upper surface. The vinyl layer and substrate are then brought into contact with one another to form a bonded laminate structure.

The UK patent no. 805,236 issued to the United States Rubber Company discloses a thermoplastic resin (preferably a vinyl resin) applied in a fluid or film form to a stretchable fabric. The resin may be spread on the fabric in the form of a creamy paste ("plastisol") or as a pre-formed thermoplastic film which is laminated to the fabric. In liquid form, the plastisol is spread on the back of the stretchable fabric using conventional coating techniques and the fabric is heated to a temperature sufficient to fuse the resin and plasticizer into a film. Thereafter, the laminate is transferred to an open vacuum mold shaped to the desired configuration. Vacuum is applied to the mold to draw the laminate into conformity with the surface of the mold before the resin sheet cools beneath its forming temperature.

The '980 patent to Hankins discloses the use of a plastisol composition formed as a heel pad and gelled slightly to form a surface skin before being imbedded into the carpet pile. Hankins uses an embossed tray filled with polyvinyl chloride plastisol which is heated until a gel "skin" forms against the tray surface. The open top tray is then placed against the carpet at the proper point and imbedded into the carpet. Heat is again applied to the back of the tray to convert the gelled and ungelled plastisol into a fused heel pad.

Bailey provides a process for preparing a molded polyurethane foam backed fabric in which the polyurethane reaction mixture is applied to the fabric without significant reaction so that it may be easily handled. The fabric is then heated to form a gelled and tack-free foam laminate which can be stored for long periods of time prior to shaping and molding.

Charnock et al discloses a method for producing a "wear-resistant" area in a surface covering material having a pile of thermoplastic flock fibers. The pile is subjected to heat and pressure in an area corresponding to the desired wear-resistant area to fuse the fibers in a particular carpet location.

Ramsay discloses a process for preparing molded fabrics comprising the steps of adhesively plying an internal layer of one or more mats of batting material to a textile fabric, applying a layer of particulate low melting fusible material to the other side of the batting, heating the pre-form to melt the particulate thermoplastic sufficiently to form a coherent tacky mass, and thereafter molding the pre-form into a rigid composite fabric.

The Canadian patent to Nicely provides a method for molding thermoplastic fabrics which includes the steps of treating the thermoplastic material with an aqueous solution of a thermoset resin, drying the thermoplastic material at a low temperature and placing the treated and dried material on a heated mold.

A two-stage "reverse forming process" is disclosed in the '634 patent to Chellis in which the first step consists of press forming a sheet of plastic material between two mold members by placing the sheet with an embossed surface in contact with the mold members. The preformed embossed member is then reversed such that its curvature is opposite that in the initial molding operation. The reversed blank is press-formed to the desired shape by bringing it in contact with a thermosetting resin and a fibrous material which forms the backing.

The '564, '018, '556 and; '311 patents to Hankins Squier, Fuji et al and Smith et al illustrate conventional methods for manufacturing molded articles comprised of a substrate and backing material.

The present invention deviates from the above prior art references in one principal feature: The simultaneous adhesion and design patterning which result from the application of heat to PVC film, carpet and hot melt adhesive during a single molding operation is not suggested or disclosed in the prior art. That is, the above references do not teach that adhesion of a PVC pad to the carpet substrate may be accomplished simultaneously with the production of a design molding on the PVC pad itself.

DETAILED DESCRIPTION OF THE PRESENTLY PREFERRED EXEMPLARY EMBODIMENT

Figure 1:
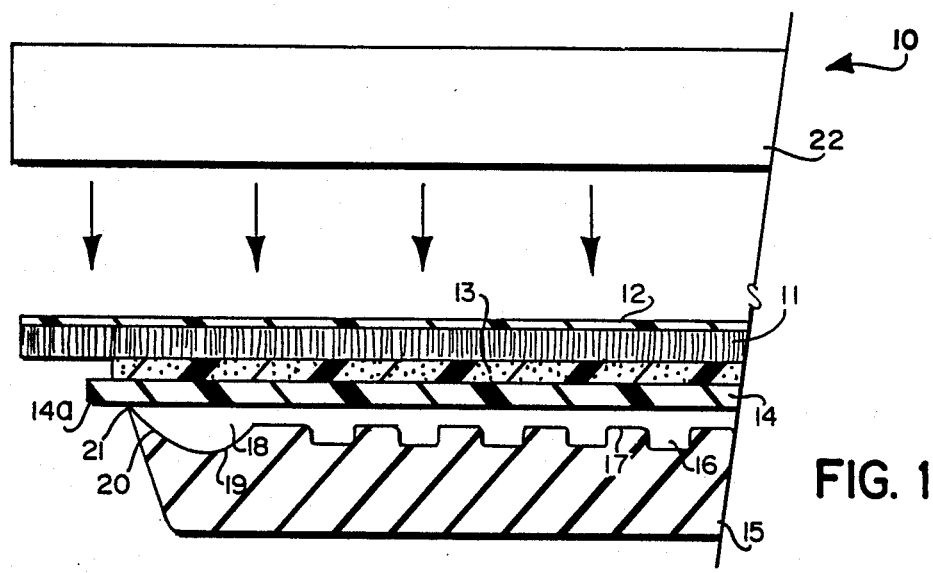
FIG. 1 is an exploded elevational view, shown in cross section, of an exemplary heel pad construction and associated pattern mold apparatus in accordance with the present invention.

The basic process steps in accordance with the present invention are as follows.

First, a flat section of blank (unpatterned) polyvinyl chloride (PVC) film or its equivalent is die cut in accordance with the desired heel pad size. The PVC film layer is then placed in position directly on top of the open face of a conventional pattern mold having grooves and recessed cavity portions which form the patterned configuration of the heel pad design upon curing and cooling. A detailed description of the grooves and recessed cavities in the mold, particularly those relating to the periphery of the heel pad, are discussed in greater detail below.

A layer of liquid or foam hot melt adhesive preferably consisting of one or more polyamides or polyester resins, is then applied uniformly to the exposed surface of the heel pad in all areas of the pad for which a design is intended. Areas which are not covered with adhesive (or which have an inadequate amount of adhesive) will not result in a pattern configuration during the molding step. It is important that the amount and temperature of the adhesive be carefully controlled during the entire adhesive/molding operation. That is, sufficient hot melt polyamide liquid or hot melt polyamide foam adhesive must be present in the area to be patterned during the molding step to ensure the necessary conductive heat transfer from the adhesive to the PVC blank. Sensible heat from the adhesive will thereby be conducted into the PVC to allow for the formation of a pattern on the opposite face of the PVC which matches the mold pattern.

The amount and application temperature of the adhesive must also be controlled to ensure that the adhesive has a sufficiently low viscosity to fully impregnate the carpet fibers once the carpet is positioned over the PVC blank and placed under compression. Impregnation of the carpet fibers thereby ensures that the area of compressed carpet covered by the PVC will form a unitary or composite substrate during subsequent cooling.

The liquid hot melt adhesive serves three separate functions. It permanently secures the carpet fibers to the PVC film via impregnation into the fibrous carpet; it forms a pattern on the PVC film; and it effects a unitary matrix composite of PVC film, hot melt adhesive and carpet.

In order to ensure the necessary control of the hot melt adhesive amount, pad location and adhesive temperature, applicants have found that a triple axis (XYZ) robot adhesive applicator device may be used. In addition, a conventional hot melt "curtain coater" such as that manufactured by George Koch & Sons, Inc. has been found acceptable for purposes of applying the adhesive in a uniform and controlled manner.

Immediately after the mold is placed under compression using, for example, a standard hydraulic press and mold clamps, the mold forms the grid-like pattern on the finished heel pad. If too much adhesive is applied, the compression may force excess adhesive out and under the heel skirt at the edge of the pad, thereby resulting in an aesthetically unappealing and unacceptable commercial product.

Thus, in a preferred embodiment of the present invention, the mold design includes a continuous peripheral channel or trough at the periphery thereof which, in combination with the PVC pad, defines a channel in the pad itself (later forming the pad edge) which receives any excess adhesive. The outside wall of the mold channel defines a dull knife edge which causes the PVC to "fold under" at its edges and project into the top portion of the carpet fibers as the mold is placed under compression. In operation, the mold forces the outside edge of the PVC (which extends a short distance over the outermost edge of the mold) down and over the hot melt adhesive composition and into the carpet. The PVC thereby becomes "tucked under" the mold to form a uniform exterior pad edge. As the mold moves down over the top of the PVC, it presses and curls the PVC inwardly toward the center of the pad and into the impregnated carpet fibers. This "tucking" action results in a clean edge formed on the periphery of the heel pad and makes it visually and aesthetically superior to the dielectric process. For example, the mold design for a 12 mil PVC pad has been found to produce better edge control and improved edge appearance than 40 mil dielectric products.

The same lamination technique may be used regardless of the fiber weight or thickness of the carpet or carpet backing components and has been found acceptable for carpet weights up to 30 ounces per square yard. The mold design used with the invention also improves the edge appearance for both low face weight constructions such as Thaxton (16 ounce) or 30 ounce "deep pile" constructions.

One reason for the improved edge control is that the mold and PVC act together to form a dam-like flow obstruction at the outermost edge of the pad which prevents the adhesive from flowing out underneath the mold at the edges of the pad as the liquid adhesive is being forced into the carpet face fibers. Typically, the outside edge of the continuous channel on the periphery of the mold terminates in a knife edge which is not capable of cutting into the carpet backing during compression, but is sharp enough to penetrate the carpet fibers and thereby act as a dam and obstruction to any flow of adhesive composition away from the heel pad. Preferably, the outside edge of the continuous peripheral channel extends slightly above the plane of the remaining mold face to allow the edge to "bite down" into the carpet to prevent any unwanted spreading or flashing of the adhesive.

Alternatively, the mold design in accordance with the invention includes a generally L-shaped channel at the periphery thereof defined by a continuous recessed flat bottom surface which terminates in a substantially vertical 90 degree outside wall which serves as the dam to prevent any unwanted flow of adhesive outside the pad. The outside vertical wall surface terminates at the top end into a knife edge which extends slightly above the plane of the remaining mold surface as described above.

Thus, during the simultaneous adhesion and pattern-forming operation, the outside vertical surface of the mold causes the edge of the PVC pad to turn down into the carpet thereby resulting in a clean and aesthetically appealing outside edge. As indicated above, the PVC tends to "tuck under" the composite and curl upwardly, i.e., in a direction toward the center of the pad. The ability of the mold design to cause the PVC to act in such a manner results in significantly improved aesthetics and improves quality assurance because the size of the PVC pad does not need to be cut as precisely in order to result in a clean edge.

The generally L-shaped peripheral channel of the mold may use a variety of different outside wall configurations (as shown in FIGS. 2A, 2B, 2C, 2D and 2E, discussed infra) which result in different pad edges, depending on the desired end product. For example, in contrast to a substantially vertical (90 degree) outside wall, the channel wall may be curved outwardly away from the mold thereby forming a more rounded pad edge. Other examples include outside channel walls which have a planar configuration and are inclined inwardly at angles slightly less than 90 degrees, e.g., in the range of 80-89 degrees, thereby resulting in a pad edge which turns inwardly toward the pad center. Such inwardly-inclined outside channel walls could also have a curved configuration if desired.

In a preferred embodiment of the invention, the total elapsed time from the time the adhesive is applied to the PVC through the positioning of both the carpet and the mold plates and application of pressure on the carpet should be in the range of 12 to 15 seconds with an upper range of between 18 and 20 seconds. The exact amount of time may vary, depending only on the type and amount of hot melt adhesive, the type and thickness of the PVC, and the form of the adhesive (foam or liquid). Such relatively short elapsed times result in higher production as compared, for example, to dielectric operations which typically require 23 to 40 seconds.

Surprisingly, the total elapsed time from the adhesive application to mold closure is not dependent upon carpet construction (unlike conventional dielectric processes). That is, the productivity remains the same for a given hot melt adhesive and pad thickness regardless of the carpet thickness or construction. Thus, the present invention offers a considerable degree of improved operating flexibility over dielectric processes. For example, the elapsed time for dielectrically sealed PVC heel pads has been found to vary from a low of about 23 seconds on a 10-ounce face weight to a high of approximately 40 seconds for a thirty-ounce face weight having 0.5 pounds EVA backing per square foot.

In carrying out the method according to the invention, applicants have also found that the PVC itself may vary in thickness, with the preferred range being between 10 and 12 millimeters with a low of between 5 and 7 millimeters, without significantly altering the pattern definition of the end product.

One further unexpected benefit from the process according to the invention is improved scuff and abrasion resistance as compared to conventional adhesive bonded heel pads or dielectric PVC heel pads. Because of the thinner PVC blanks being used, they are far more cost effective and do not require high levels of filler materials such as calcium carbonate (typically in the range of about 13–15% or more by weight as compared to about 2% by weight or less in the present invention) which otherwise tend to reduce both the scuff and abrasion resistance.

Another beneficial feature of the invention is that the cooled and solidified end product forms a composite substrate beneath the vinyl pad consisting of adhesive and compressed carpet face yarns or tufts. After the adhesive impregnates the fibers of the carpet tufts and undergoes compression, it solidifies into a uniform, integral composite having the same patterned configuration as the PVC.

The use of hot melt liquid adhesives in the manner described above also permits the heel pad to be applied to pre-molded carpet, thereby eliminating the additional steps necessary to mold flat carpets having pads applied using dielectric techniques. The position of the heel pad can thereby be more accurately controlled, i.e., within about 3–4 mm. As indicated above, with the dielectric process on post-molded carpets, the position of the heel pad may vary as much as one-half inch.

FIG. 1 of the drawings represents an exploded elevation view of the preferred embodiment of the present invention shown generally as 10. A polyvinyl chloride (PVC) blank 14 (one surface of which will be placed in contact with the hot melt adhesive) is positioned directly on top of the top face of open pattern mold 15 (which is maintained at a temperature of about 75°–80° F.) with the periphery of the blank 14a extending slightly beyond the upper outside edge 21 of the mold channel on all sides. The mold itself includes a plurality of ribs 17 and recesses 16 which form corresponding patterned ridges in the heel pad. The preferred mold face design also includes a continuous peripheral channel 18 which forms the outside edge of the completed pad after the adhesive cools and solidifies.

As FIG. 1 illustrates, channel 1B may be defined by a curved radius bottom surface portion 19 which terminates in a flared dam or weir portion 20 which in turn terminates in an in-turned knife edge 21. Alternatively, channel 18 may have a generally L-shaped configuration in which the outside wall is disposed at a 90° angle or an acute angle relative to bottom surface 19 (see also FIGS. 2A through 2E, discussed below). As the mold face is placed under compression, knife edge 21 forces the overlapping edge portion of PVC 14 downwardly and into the carpet. At the same time, knife edge 21 combines with downturned PVC blank 14 to form a dam to prevent any excess adhesive from flowing beyond the pad edge into the fibers of carpet 11. Preferably, a controlled amount of adhesive should be used to ensure uniform adhesion and pad definition under pressure without overflow into the carpet.

After the PVC blank 14 is placed over the top face of the mold, heated liquid or foam hot melt adhesive 13 is applied at a temperature in the range of about 400°–435° F. in a uniform layer on all back side areas of the PVC. As indicated above, the conductive heat transfer between the hot melt adhesive and PVC layer 14 allows the PVC to reach a temperature level such that it may be formed into a design pattern during the subsequent molding operation. Once the adhesive layer is in position, tufted carpet 11 is immediately placed face side down on the hot melt adhesive such that the carpet face fibers will be impregnated with adhesive during the pattern forming laminating step. Carpet 11 is shown having a conventional thermoplastic woven or non-woven primary backing 12.

Finally, once the pattern mold, PVC blank, adhesive and carpet are in position, the stacked components are compressed using a standard hydraulic press 22 preferably with a top flat mold cover plate (not shown) which applies uniform pressure to the components in their aligned position for a period of about 10–12 seconds, i.e., sufficient time for the hot melt adhesive composition to cool and solidify to form the final laminated product.

Figure 2:
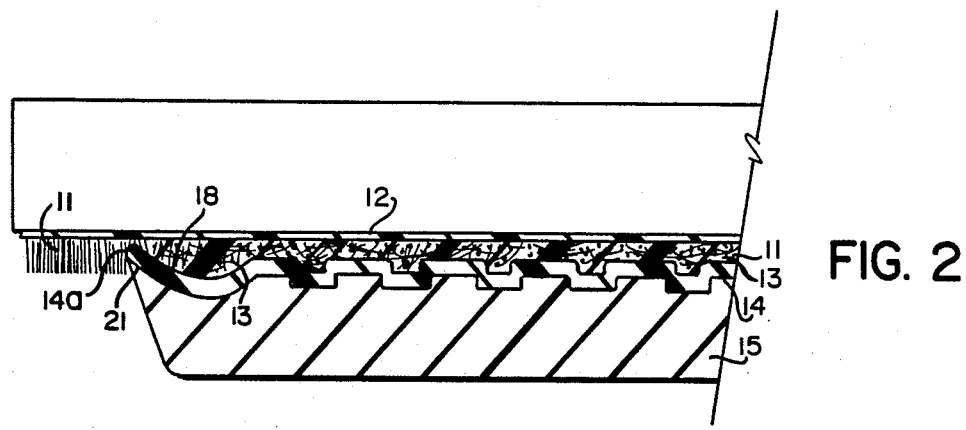
FIG. 2 is an elevational view, shown in cross section, of the heel pad construction depicted in FIG. 1, showing the pad within the pattern mold apparatus in a closed position.

FIG. 2 of the drawings illustrates the mold press operation depicted in FIG. 1 in its final stage, i.e., during the cooling step with the combined elements under compression. Thus, the hot melt liquid or foam hot melt adhesive composition becomes uniformly dispersed over the back face of the PVC pad. The pad itself conforms to the contours of the plurality of ribs and recesses in the mold face, including continuous peripheral channel 18. FIG. 2 also illustrates the manner in which mold 15 forces the PVC blank 14 into the fibers of carpet 11 to form a uniform, clean edge at the outside of the heel pad. Outside edge 21 of mold 15 also prevents any excess adhesive from escaping into the carpet outside the mold.

Figure 2A:
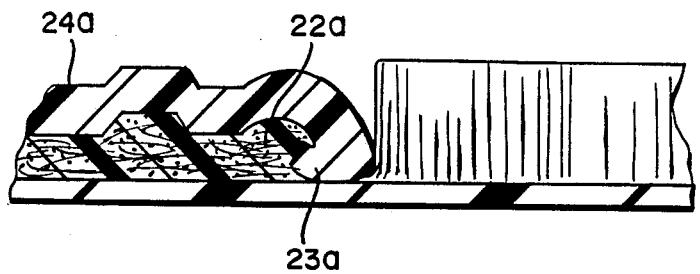
FIGS. 2A, 2B, 2C, 2D and 2E are partial elevational views, shown in cross-section, of four exemplary embodiments of the edge portions of heel pad constructions in accordance with the invention.

FIGS. 2A, 2B, 2C, 2D and 2E of the drawings illustrate alternative embodiments of the pad edge configuration in accordance with the invention and reflect differences in the configuration of the mold channel which forms the outside pad edge during the simultaneous adhesion and molding operation. FIG. 2A depicts an edge configuration similar to that described above in FIGS. 1 and 2, i.e., a generally uniform curved outside edge 22a formed by the generally radial bottom surface of the peripheral mold channel. FIG. 2A also shows the bottom edge 23a of PVC blank 24a after it becomes "tucked under" the heel pad, i.e., after it is forced downwardly and inwardly toward the pad center during the mold closure step.

Figure 2B:
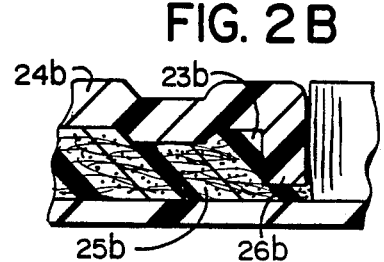

FIG. 2B of the drawings depicts an alternative embodiment of the edge portion of the heel pad (shown at 23b). Unlike the embodiment in FIGS. 1, 2 and 2A, edge portion 23b is formed by using a mold having a generally L-shaped peripheral channel in which the outside edge of the channel is disposed at a 90° angle relative to the bottom surface of the channel. During closure, the mold forces PVC blank 24b having a terminal reentrant portion 26b downwardly and into the composite 25b formed beneath PVC blank 24b.

Figure 2C:
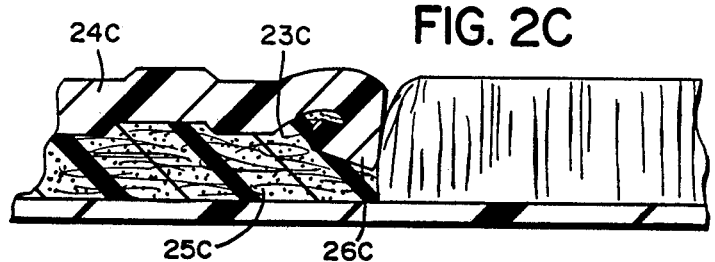

FIG. 2C of the drawings shows yet another embodiment of the invention in which pad edge 23c is formed by a mold having a peripheral channel with a generally L-shaped configuration and flat bottom surface which terminates in a substantially vertical planar surface. As the mold face is placed under compression, the knife edge of the pattern mold forces the edge of PVC blank 24c having terminal reentrant portion 26c into the heel pad composite 25c to form a clean, substantially vertical outside edge surface. PVC blank 24c is shown "tucked under" via terminal reentrant portion 26c in a V-like configuration.

Figure 2D:
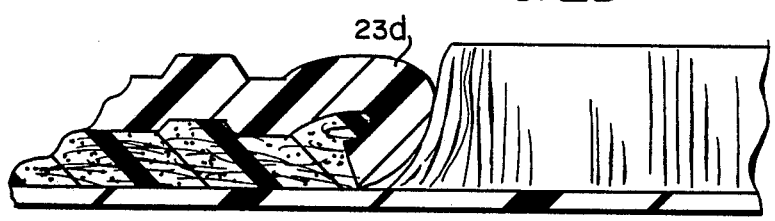
Figure 2E:
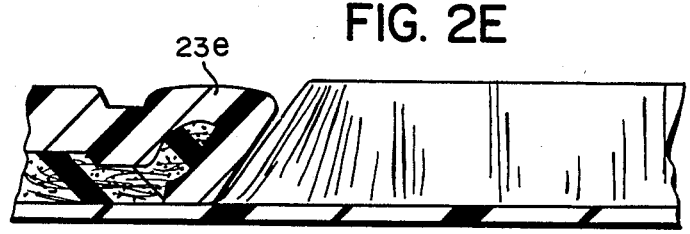

FIG. 2D shows a similar embodiment of an edge 23d formed from a mold design in which the bottom surface of the mold channel terminates in a generally radial outside wall surface which is inclined inwardly, i.e., at an angle less than 90 degrees (preferably between 80–90) relative to the bottom surface. FIG. 2E shows an embodiment in which the pad edge 23e is formed from a mold having the outside surface of the peripheral channel inclined generally inwardly. However, the outside surface utilizes a planar rather than radial configuration. In all of the alternative embodiments depicted in FIGS. 2A through 2E, the height of the peripheral edge may be equal to or slightly higher or lower than the remainder of the pad.

Figure 3:
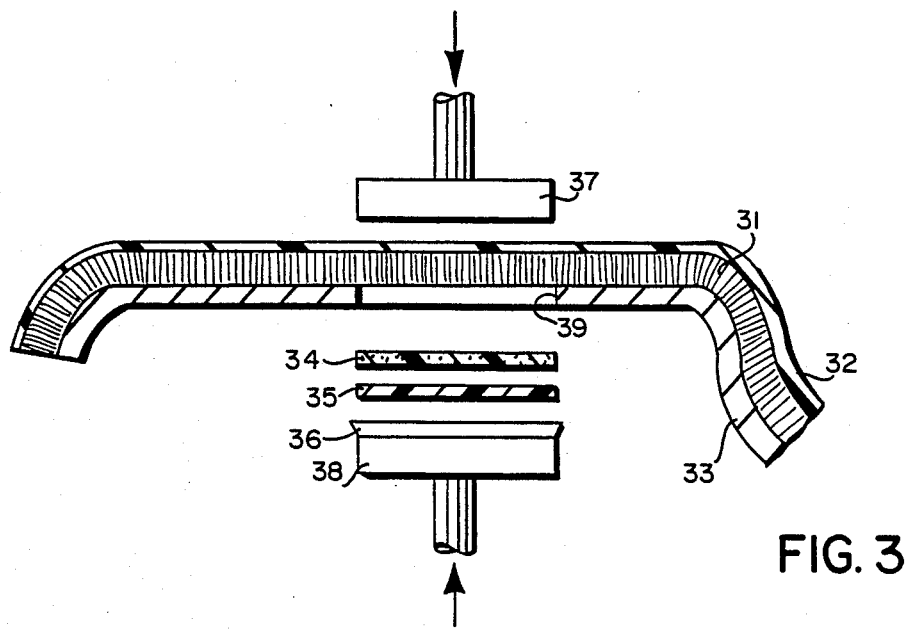
FIG. 3 is an exploded elevational view of a complete automotive carpet, including an exemplary heel pad construction and associated pattern mold apparatus in accordance with the invention.

FIG. 3 of the drawings shows a preferred embodiment of the present invention as it might be applied to a pre-molded (as opposed to flat unmolded) automotive carpet. Carpet 31 having a thermoplastic backing 32 is shown after it has been molded to conform to support structure 33 which is comprised of rigid plastic material identical in form to the interior carpet configuration of an automobile. The support structure 33 includes rectangular opening 39 which is sized to receive the heel pad blank as it is adhesively applied to carpet 31 during a lamination operation in accordance with the invention. Die cut PVC blank 35 is placed on top of mold 36 followed by the application of a uniform layer of hot melt adhesive 34. The adhesive-coated PVC blank is then placed into position in contact with the fibrous face elements of carpet 31. Immediately thereafter (less than about 5–8 seconds), opposing vertical press elements 37 and 38 move into position to place the entire heel pad, carpet and mold combination under sufficient hydraulic pressure to cause a printed pattern to be embossed on the PVC pad face.

Figure 4:
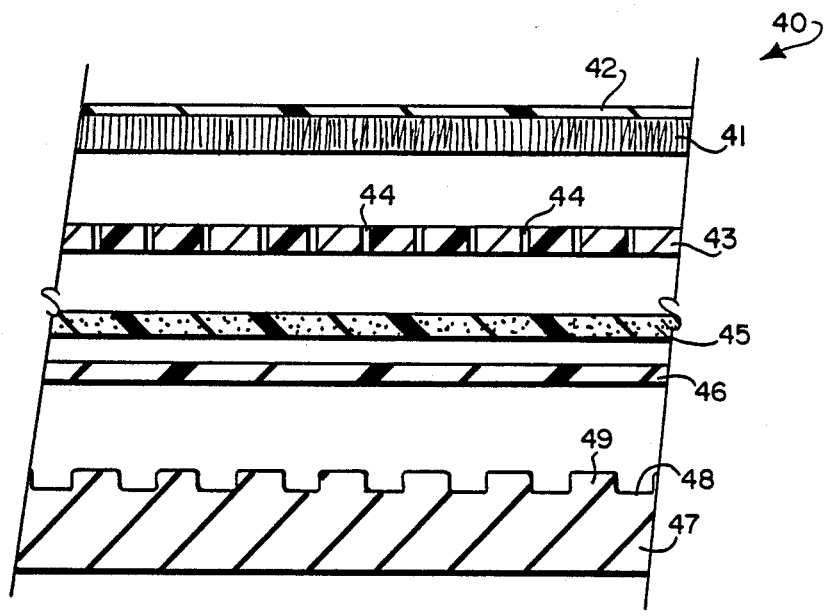
FIG. 4 is an exploded elevational view, shown in partial cross section, of an alternative embodiment of the heel pad construction in accordance with the invention.

FIG. 4 of the drawings illustrates an alternative embodiment of the present invention whereby a perforated low cost composite of considerably greater thickness (more than 20 millimeters) is used in combination with a blank PVC pad in order to reduce overall material cost if desired. Useful composite materials include those containing polyurethane or a polyolefin such as polyethylene or polypropylene. Significantly, the perforated low cost composite does not adversely affect the in situ formed design pattern on the thinner PVC blank which occurs during the molding and adhesion step. This alternative embodiment (shown generally as 40) employs a mold 47, again having a plurality of recessed and ribbed portions 48 and 49, respectively, which define the top face of the mold upon which the PVC blank 46 is positioned.

Thereafter, a uniform layer of polyamide hot melt adhesive 45 at a temperature in the range of about 400°–435° F. is placed on the PVC and 46, followed by placement of the perforated composite liner material 43 having a plurality of perforations 44. Carpet 41 with backing 42 is then immediately positioned directly on top of the perforated composite and the entire stacked and aligned combination is placed into a conventional mold press. Unlike the first embodiment, however, the mold compression causes a portion of the liquid hot melt adhesive to migrate through the perforations of the composite liner 43 onto the surface and into recesses of the carpet being formed. The heated hot melt adhesive on the surface of the PVC pad adjacent to the mold face, thereby forms the same pad design once the adhesive cools and solidifies.

Figure 5:
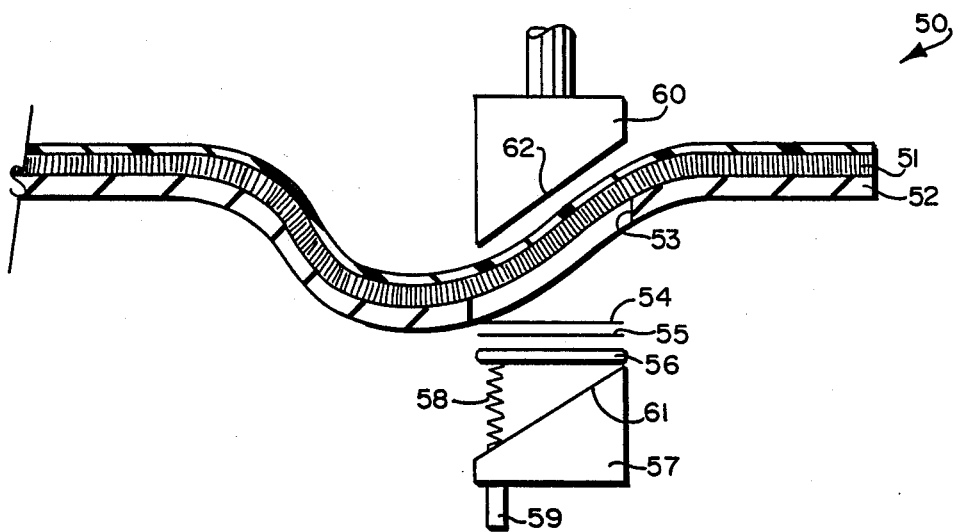
FIG. 5 is an elevational view, shown in cross section, of a further embodiment of the heel pad construction and related mold apparatus in accordance with the invention.

FIG. 5 of the drawings shows yet another alternative embodiment of the present invention wherein the heel pad is affixed to a contoured portion of a pre-molded automotive carpet such as that used to cover the well known "transmission tunnel" area. In this embodiment, tufted and thermoplastic backed carpet 51 is adhesively secured to the PVC pad 55 using liquid hot melt adhesive 54. The shaping of the heel pad into a molded configuration is accomplished by mold presses 57 and 60, respectively. As FIG. 5 illustrates, the liquid adhesive, PVC blank and pattern mold face 56 are offset with respect to the base 61 of lower press member 57 which is positioned substantially parallel to the angle of the carpet tunnel area receiving the heel pad. Initially, PVC blank 55, liquid adhesive 54 and mold face plate 56 are disposed in a horizontal position with one end thereof supported against the top edge 56 of mold press member 57 with the other end supported by spring means 58. As mold presses 57 and 60 move into position in alignment with the pre-molded carpet 51, spring means 58 gradually depresses as the PVC pad comes into contact with the angled carpet surface supported by the angled bottom edge 62 of mold press 60.

Hot melt adhesives useful in accordance with the present invention include bonding and coating agents which achieve maximum strength upon cooling and solidifying (as contrasted with other adhesives which achieve a solid state through evaporation or removal of solvents). The preferred adhesives useful in the present invention include polyamides because most automotive carpets contain Nylon 66 which readily bonds with such adhesives. The polyamide adhesives also demonstrate exceptionally good adhesion to the PVC pad material. Specific examples of acceptable adhesives include Union Camp UC-2648, UC-2645C, H. B. Fuller HM-904 and HL-6095 or National Adhesives 34-3402 and 34-3406. The same polyamide hot melt adhesives may be used in foam (as opposed to liquid) hot melt adhesives, the only difference being the gas insertion into the hot melt.

Acceptable adhesive formulations vary widely depending on raw materials, intended end use, properties and price considerations and generally consist of a thermoplastic polymer having adequate resistance to heat degradation and a sufficient number of polar groups. Examples of preferred polymers include polyamides and polyester resins. These are relatively high molecular weight condensation polymers, (i.e., higher than those of, for example, amorphous polyethylene addition polymer hot melts), which produce sufficient viscosity, high strength and good mechanical and adhesion properties when used in accordance with the invention.

Prior to heating, almost all hot melt adhesives are 100% solid thermoplastic materials. However, the adhesives useful in the present invention also include a wide variety of hot melt foam adhesives, with the liquid thermoplastic material being reduced in wt. % by an appropriate blowing agent such as carbon dioxide or nitrogen. In such applications, it is possible to lower the cost and to vary the rigidity and "stiffness" of the cooled and "solidified" adhesive by adjusting the foam composition accordingly.

In either form (liquid or foam), the preferred hot melt adhesives achieve a solid state and ultimate strength through cooling, as contrasted with other adhesives which achieve the solid state through evaporation or removal of solvents. The ideal adhesive should be solid at both room temperature and normal automotive carpet environmental temperatures and be capable of being stored and handled without blocking. Upon heating, the adhesive should melt sharply, flow freely and be sufficiently stable even with prolonged heating to withstand local overheating. In liquid melt form, it may be applied to the mold work by a nozzle, a wheel applicator, a curtain coating head or by spraying. Its heat loss rate and temperature of solidification should be such that ample time would be available to effect a pattern definition with the mold face and laminate the two substrates sufficiently to effect a matrix or composite.

The above method for applying a PVC heel pad to automobile carpeting may be performed using commercially available hot melt adhesive applicator robots and pneumatic press equipment. A Nordson 2302 hot melt dispenser in combination with a 3 axis robot (or Magnatrace 1000) with a pneumatic press can be used for this purpose. The Nordson 2302 melts and pumps the hot melt adhesive while the Robot or the Magnatrace 1000 guides the dispenser to apply the hot melt adhesive to the required location. Also, a Koch curtain coater can be used to both melt dispense and guide the adhesive uniformly into the mold.

In addition, it has been found that for certain applications it may be advantageous to use more than one hot melt adhesive--the first of which is lower in cost and provides the necessary mass for purposes of effective heat retention and resultant heat transfer to the PVC blank, with the second adhesive being a higher cost polyamide or polyester with superior bonding capabilities to the PVC. As those skilled in the art will appreciate, the optimum heat transfer necessary to accomplish the desired pattern on the PVC blank may be affected by other factors such as the temperature of the adhesive, preheating (if any) to the mold, the amount of time from application of the adhesive to mold closure and even the amount of pressure applied to the pattern following closure.

In order to demonstrate the simultaneous adhesive bonding/design lamination technique according to the invention, a Nordson No. 170 foam hot melt apparatus and Nordson XYZ robot and pneumatic press (operating at 60 pounds air pressure), were used for purposes of performing the following examples utilizing foamed polyamide Union Camp hot melt adhesive No. UC-2648.

EXAMPLE 1

A 45% weight reduction polyamide hot melt adhesive UC-2648 was applied in a uniform even layer to an unpatterned 12 mil PVC blank which had been die cut and sized to fit directly on the top face of the pattern mold. The temperature of the foam adhesive was maintained at 400° F., with approximately 19.5 grams of adhesive being applied before covering the PVC with standard medium weight tufted carpet. Thereafter, the PVC, carpet and mold were transferred to a press and subjected to uniform compression at 60 pounds. The total elapsed time from application of adhesive to full press condition for the mold was approximately 16 seconds. The mold was maintained under constant pressure for approximately 30 seconds. The resultant heel pad showed excellent adhesion to the carpet and an imprinted design on all contact areas.

The following additional examples used the same three basic processing steps, with varying foam compositions, PVC thicknesses and foam temperatures. All of the examples also used a Nordson foam adhesive applicator, Nordson XYZ Robot and Nordson pneumatic press.

| Example | Adhesive Temp. (°F.) | Adhesive Type | Amount of Adhesive (gms) | Elapsed Time (Sec.) | Thickness of PVC Blanks (mils) | Notes |
|---|---|---|---|---|---|---|
| 2 | 400 | foam (45% red.) | 19.5 | 16 | 12 | Added perforated EVA filled Insert (Moore Plastic No. 5.2 M.I. or MB-440-E) |
| 3 | 425 | foam (45% red.) | 22.5 | 12 | 12 | |
| 4 | 425 | foam (45% red.) | 22.5 | 11.15 | 20 | |
| 5 | 425 | foam (65% red.) | 14.5 | 10.2 | 12 | |
| 6 | 425 | foam (65% red.) | 14.5 | 10.2 | 12 | Dense EVA Backed Carpet |
| 7 | 435 | foam (70% red.) | 17.6 | 10.2 | 12 | Dense EVA Backed Carpet |
| 8 | 435 | foam (70% red.) | 19.0 | 10.2 | 12 | |
| 9 | 435 | foam (70% red.) | 19.0 | 10.2 | 12 | |
| 10 | 435 | foam (70% red.) | 19.0 | 7.6 | 12 | Mold temp = 85° F. |
| 11 | 435 | foam (70% red.) | 19.0 | 7.6 | 12 | Mold temp = 80° F. |
| 12 | 435 | foam (70% red.) | 19.0 | 7.6 | 12 | Mold temp = 80° F. |
| 13 | 435 | foam (70% red.) | 19.0 | 7.6 | 12 | Mold temp = 80° F. |
| 14 | 435 | foam (70% red.) | 19.0 | 7.6 | 12 | Mold temp = 70° F. |
| 15 | 435 | foam (70% red.) | 19.0 | 7.6 | 12 | Added perforated PVC insert |

Based on the foregoing examples, one preferred embodiment of the present invention utilizes a foam adhesive at an application of about 435° F. with a 70% foam reduction. In that regard, the term "reduction" indicates the percentage reduction in weight percent of adhesive resulting from the blowing agent which is injected into the adhesive to form a foam. For example, a 70% reduction means 70% of the foamed adhesive volume consists of gas such as nitrogen, carbon dioxide or equivalent blowing agent to thereby reduce the weight of adhesive solids and assist in allowing a uniform layer to be applied to the PVC heel pad.

The above examples also indicate that for satisfactory results, the mold should be controlled at an ambient temperature of between 75° F. and 80° F. with a fast set time of 7.2 seconds utilizing about 19 grams of hot melt adhesive composition on average (with a preferred amount being approximately 8 ounces per square yard of PVC pad area covered). The preferred cooling time should be about 8 seconds making a total of about 15 seconds overall for the entire molding lamination process.

Adhesion tests were also conducted on the laminate structures formed from the above examples. In each case, a 2"×6" piece of material was tested in both directions, i.e., MD (machine direction) and AMD (perpendicular to or across the machine direction) on a conventional Instron testing apparatus. The results set forth below in Table II are representative of the entire sample group.

TABLE II

|  |  | (Adhesion Values) IN LBS. | | |
|---|---|---|---|---|
|  |  | MD[1] | AMD[2] |  |
| Sample #1 | (1) | 15.8 | 29.3 | 45% Reduction |
|  | (2) | 14.5 | 17.8 | 400° F. 12 mil |
|  | x = | 15.2 | 23.6 | (16 sec.) 19½ gms. |
| Sample #4 | (1) | 17.0 | 20.8 | 45% Reduction |
|  | (2) | 20.0 | 15.8 | 400° F. 22 gms. |
|  | x = | 18.5 | 18.5 | (11 sec.) 20 mil PVC |
| Sample #5 (14½ gm) |  | 15.5 | 12.5 | 65% Reduction |
| Sample #7 (17.6 gm) |  | 27.5 | 12.3 | 70% Reduction |
| Sample #11 (19 gm) |  | 21.8 | 10.8 | 70% Reduction |
| Sample #12 | (1) | 27.7 | 13.5 | 70% Reduction 12 mil |
|  | (2) | 35.5 | 12.5 | 435° F. Temp. 19 gms. |
|  | x = | 31.6 | 13.0 | Mold Chilled (7.6 sec.) |
| Sample #13 | (1) | 15.4 | 16.0 | Same as #12 But 12 mil |
|  | (2) | 15.0 | 15.0 | High Luster Up 19 gms. |
|  | x = | 15.2 | 15.5 | Mat Finish Bonded To Car (7.6 Sec) |

Notes:
[1]MD = Machine Direction
[2]AMD = Across Machine Direction

As Table II and the associated examples indicate, in most cases a combination of higher temperature (435° F. versus 400° F.), high percentage reduction (70% versus 45%), and shorter elapsed times (7.6 seconds versus 11 or 16 seconds) generally provide better adhesive values for the end product.

Example 17

The process described in Example 1 was repeated with both 18 and 22 mil PVC pads using an adhesive temperature of 425° F. with the same mold compression pressure. The results were compared to 29 mil and 50 mil examples under the same conditions. The test results demonstrate that the lower thicknesses of PVC appear to give better definition to the mold pattern. It also appears that the same design can be achieved with PVC blanks having thicknesses as low as 5 mils but with an average range of about 12 mils achieving the best results.

EXAMPLE 18

As indicated above, one of the unexpected benefits achieved by the process according to the present invention is the improved abrasion resistance of the PVC heel pad following lamination. In order to evaluate the abrasion resistance, studies were conducted on a Tabor abraider for 7,000 cycles each with new H-18 wheels on both a standard 40 mil Ford PVC heel pad simultaneously with a 12 mil PVC pad used to adhesively bond the carpet in accordance with the present invention. The 40 mil Ford heel pad (produced by the dielectric process) had visibly deeper grooves, i.e., deeper than the 12 mil PVC pad. Although neither sample wore out after 7,000 cycles, the 12 mil product was decidedly superior to the 40 mil dielectric pad in overall wear resistance.

The above two heel pads were also evaluated for scuff resistance. The 12 mil PVC pad (containing 2.2% by weight ash filler) was found superior based on a visual examination of white scratch marks to the thicker 40 mil PVC pad due to the presence in the latter of a high concentration of conventional filler materials (13.18% by weight calcium carbonate).

EXAMPLE 19

HM-904 polyamide hot melt adhesive was applied to a PVC pad with the adhesive temperature being 425° F. A perforated strip of EVA (ethylene vinyl acetate copolymer filled to 76% by weight with barium sulfate), approximately 40 mils thick, with perforated ⅛th inch diameter holes spaced ⅛th inch between holes at the top, bottom, left and right was then placed on the adhesive coated PVC film. The carpet was placed on top of the perforated EVA pad and pressure applied. The adhesive exuded between the open spaces up through the perforated pad and onto the carpet face. The 12 mil blank took the design shape of the mold (a rib pattern) and the adhesion of the composite to the carpet and PVC was found to be satisfactory.

EXAMPLE 20

HM-904 polyamide hot melt adhesive was applied directly to a perforated low cost composite pad positioned on top of the carpet, and a 12 mil PVC sheet stock was placed directly on top of the HM-904 followed by compression with a rib mold. The perforated PVC pad contained ⅛th inch diameter perforations spaced ⅛th inch apart in all directions. The HM-904 hot melt adhesive was applied at 425° F. The results showed excellent rib definition on the reverse (outer) side of the 12 mil PVC sheet. The adhesive provided a continuous layer on top of the thick PVC pad but less volume requirement as compared to that transferred directly to the carpet face as in Example 1. Also, the perforations provided an escape to allow adhesive to penetrate into the carpet sufficient to bond the composite to the carpet.

Any number of thermoplastic materials other than ethylene vinyl acetate could be used for the low cost composite insert in accordance with the present invention. Typical examples include polyurethanes which are filled with mineral or fiber; filled polyvinyl chloride, filled polyesters; filled polyamides; polyolefins (polyethylene or polypropylene) which are filled with mineral or fiber; or combinations of the above.

EXAMPLE 21

Liquid (as opposed to foam) hot melt adhesive HM-904 was applied in a uniform layer to an unpatterned 12 mil PVC blank which had been die cut and sized to fit on the top face of a pattern mold. The temperature of the adhesive was applied at 425° F., with approximately 18 grams per 100 square inches of adhesive being applied before covering the PVC with 16 oz. tufted carpet. Immediately thereafter, the PVC, carpet and mold were placed under 90 psi compression for a period of 10 seconds. The total elapsed time from initial application of the liquid adhesive until removing the composite from the mold was 15 seconds. The resultant heel pad showed excellent adhesion and the desired imprinted design on all contact areas.

EXAMPLE 22

In order to demonstrate the hot melt adhesive method using polypropylene face fiber carpets and PVC pads, 2.5 grams per 2"×6" area of PVC pad of H. B. Fuller HM-904 adhesive was applied in a uniform even layer to an unpatterned 12 mil PVC blank which had been sized to fit directly on top of the pattern mold. The adhesive temperature at the time of application to the blank was 400° F. The blank was then covered with a tufted polypropylene face fiber carpet with a filled EVA extruded backing. The carpet weight was 64.8 ounces per square yard with an estimated EVA backing of 0.3 EVA (0.3 pounds/ft² or 43 ounces per square yard). The extruded EVA backing and carpet were about 21-22 ounces per square yard.

The PVC, carpet, and mold were then transferred to a hydraulic press and subjected to uniform compression at 90 psi as described above. The resultant heel pad showed excellent adhesion to the carpet and an imprinted design on all contact areas. The adhesive strength of the resultant pad using the hot melt application was then compared to a dielectric application using a 2"×6" Instron peel test with the following results. The dielectric bonding strength for the dielectric product was 3.2 lbs. as compared to 10 lbs. for the hot melt adhesive laminate according to the invention. A second adhesive application was made as described above using 24 grams adhesive per 2"×6" strip with a resulting peel test value in excess of 28 lbs.

As indicated above, it is essential in performing the process according to the present invention that good adhesive control be maintained in terms of the thickness of adhesive agent and its positioning on the back of the PVC blank. For example, if void spaces exist on the PVC blank during adhesive application, the ability of the liquid adhesive to conduct heat through to the PVC during the molding operation is adversely affected and thereby alters the pattern of the end product. The adhesive must therefore be applied in an amount sufficient to effect the desired pattern and not leave any void spaces on the back surface of the PVC pad which is in contact with the carpet.

The method according to the present invention also contemplates different amounts of adhesive for different sections of the heel pad to effect different adhesive values, i.e., to vary the bond strength by location. It is possible (in fact, required by some automobile manufacturers) to have less pull strength in the center zone of a pad than on the periphery. Typically, an inside (center) portion requires 10 pounds of resistance, while the outside may require 10 to 20 pounds.

It is also possible to vary the composition of the foam adhesive whereby a "softer" edge and/or counterportion may be formed depending on the market requirements. For example, by varying the type and amount of plasticizer of the PVC or gas/blowing agent in the foam, the hardness or durometer of the pad may be modified, depending on the desired application.

As those skilled in the art will appreciate, it is also possible to use a combination of flowable foam adhesive and liquid (unfoamed) adhesive to achieve the desired lamination. For example, it may be desirable to apply flowable foamed hot melt adhesive to the center portion of the heel pad blank with liquid (unfoamed) adhesive being used on the periphery, or vice versa.

Finally, although the present invention has been used with PVC thicknesses as low as 7 mils, the thickness of the PVC blank must be sufficient to provide good pattern definition without any "moddled" effect which results from the carpet tuft pressure against the patterned PVC. That is, the combined thickness of the hot melt adhesive and PVC must be sufficient to overcome any moddled appearance in the end product.

While the invention herein has been described in connection with what is presently considered to be the most practical and preferred embodiment, it is to be understood that the invention is not to be limited to the disclosed embodiment, but is intended to cover various modifications and equivalent arrangements within the spirit and scope of the appended claims.

We claim:

1. A patterned heel pad adhesively bonded to automotive carpeting, said carpeting having a fibrous exterior and thermoplastic backing, said bonded and patterned heel pad comprising a sheet of unpatterned polyvinyl chloride and said fibrous exterior of said carpeting having impregnated therein liquid hot melt adhesive in an amount sufficient to adhesively bond said polyvinyl chloride to said fibrous exterior and form a coherent solid layer having the same pattern as said heel pad upon fusion and solidification, said pattern for said heel pad being formed by a mold under pressure in situ at the time said heel pad is adhesively bonded to said carpeting.

2. A patterned heel pad according to claim 1, wherein said sheet of polyvinyl chloride has a thickness in the range of between 5 and 50 millimeters.

3. A patterned heel pad according to claim 1, wherein said hot melt adhesive comprises polyamide or polyester resin compositions.

4. A patterned heel pad affixed to automotive carpeting of the type having a fibrous exterior, wherein said heel pad is formed by the process of
    (a) positioning an unpatterned thermoplastic heel pad blank onto the top face of a pattern mold;
    (b) depositing a uniform layer of liquid hot melt adhesive to the back surface of said unpatterned thermoplastic heel pad blank, said liquid hot melt adhesive being formable into a coherent solid layer upon cooling and solidification;
    (c) immediately bringing the fibrous exterior of said automotive carpet into contact with said hot melt adhesive on said unpatterned heel pad blank; and
    (d) applying uniform pressure to said pattern mold, unpatterned thermoplastic heel pad blank and automotive carpeting to adhesively bond said heel pad blank to said carpet and to simultaneously form, in situ, a pattern image of the mold on the opposite surface of said heel pad.

5. A patterned heel pad according to claim 4, wherein said unpatterned thermoplastic heel pad blank comprises polyvinyl chloride having a thickness in the range of between 5 and 50 millimeters.

6. A patterned heel pad according to claim 4, wherein said hot melt adhesive comprises a foam containing polyamides and a blowing agent and wherein said foam is reduced in weight between 10 and 80%.

7. A patterned heel pad according to claim 4, wherein said hot melt adhesive is applied to said thermoplastic heel pad blank at a temperature of between 370° F. and 470° F.

8. A method according to claim 4, wherein said pattern mold is maintained at a temperature of between 65° F. and 85° F.

9. A patterned heel pad according to claim 4, wherein the time for completing steps (b), (c) and (d) is between 10 and 20 seconds.

10. A patterned heel pad according to claim 4, wherein said hot melt adhesive comprises polyamide or polyester resin compositions.

11. A patterned heel pad according to claim 4, wherein said carpeting contains polypropylene face fibers.

12. An automotive carpet having one or more heel pads affixed thereto, each of said heel pads being formed by the process of
   (a) positioning an unpatterned thermoplastic heel pad blank onto the top face of a pattern mold;
   (b) depositing a uniform layer of liquid hot melt adhesive to the back surface of said unpatterned thermoplastic heel pad blank, said liquid hot melt adhesive being formable into a coherent solid layer upon cooling and solidification;
   (c) immediately bringing the fibrous exterior of said automotive carpet into contact with said hot melt adhesive on said unpatterned heel pad blank; and
   (d) applying uniform pressure to said pattern mold, unpatterned thermoplastic heel pad blank and automotive carpeting to adhesively bond said heel pad blank to said carpet and to simultaneously form, in situ, a pattern on the opposite surface of said heel pad.

13. A composite carpet structure comprising a a carpet layer, a thermoplastic layer, and an adhesive layer which adhesively bonds said themoplastic layer to a region of said carpet layer, said adhesive layer having been formed using a hot melt adhesive and said thermoplastic layer including a continuous edge which defines the periphery of said region and which retains said adhesive layer within said defined periphery.

14. A composite carpet structure as in claim 13, wherein said thermoplastic layer is patterned when bonded to said carpet layer.

15. A composite carpet structure as in claim 14, wherein said thermoplastic layer is nonpatterned prior to bonding to said carpet layer.

16. A composite carpet structure comprising a carpet layer, a patterned thermoplastic layer, and an adhesive layer which bonds said thermoplastic layer to said carpet layer, said adhesive layer having been formed using a hot melt adhesive and wherein said thermoplastic layer is unpatterned prior to its bonding to said carpet layer, and wherein said adhesive layer is uniform in an amount sufficient to effect simultaneous patterning of said thermoplastic layer and bonding thereof to said carpet layer.

17. A carpet which includes a wear-resistant region, said region including a layer of a non-prepatterned thermoplastic material, and an adhesive layer uniformly interposed between, and bonding, said adhesive layer having been formed using hot melt adhesive and said thermoplastic material layer and said carpet, wherein said thermoplastic material layer is patterned upon bonding to said carpet by said adhesive layer.

18. A carpet structure comprising a carpet layer, a thermoplastic layer, and an adhesive layer which bonds said thermoplastic layer to a region of said carpet layer, said adhesive layer having been formed using hot melt adhesive and said thermoplastic layer having a peripheral portion bounding said carpet region, said peripheral portion terminating in a reentrant portion embedded within said adhesive layer.

19. A carpet structure as in claim 18, wherein said thermoplastic layer is patterned.

20. A carpet structure comprising a carpet layer, an adhesive layer, and a thermoplastic layer bonded to said carpet layer by means of said adhesive layer, said adhesive layer having been formed using a hot melt adhesive and said thermoplastic layer having an inwardly turned peripheral edge embedded within said adhesive.

21. A carpet structure as in claim 20 wherein said thermoplastic layer is patterned.

22. A carpet structure as in claim 11 or 21, wherein said thermoplastic layer is unpatterned prior to bonding to said carpet layer yet is patterned during said bonding to said carpet layer.

23. A carpet structure comprising a carpet layer, a thermoplastic layer, and an adhesive layer which bonds said thermoplastic layer to a region of said carpet layer, said adhesive layer having been formed using a hot melt adhesive and said thermoplastic layer having a thickness less than about 15 mils.

24. A method for simultaneously pattern forming and affixing a thermoplastic heel pad to automotive carpeting of the type having a fibrous exterior, comprising the steps of:
   (a) positioning an unpatterned thermoplastic heel pad blank onto the top face of a pattern mold;
   (b) depositing a uniform liquid layer of hot melt adhesive to the back surface of said unpatterned thermoplastic heel pad blank, said hot melt adhesive being formable into a coherent solid layer upon cooling and solidification;
   (c) immediately bringing the fibrous exterior of said automotive carpet into contact with said hot melt adhesive on said unpatterned heel pad blank; and
   (d) applying uniform pressure to said pattern mold, unpatterned thermoplastic heel pad blank and automotive carpeting to adhesively bond said heel pad blank to said carpet and to simultaneously form, in situ, a pattern on the opposite surface of said heel pad.

25. A method according to claim 1, wherein said unpatterned thermoplastic heel pad blank comprises polyvinyl chloride having a thickness in the range of between 5 and 50 millimeters.

26. A method according to claim 1, wherein said hot melt adhesive comprises a foam containing polyamides and a blowing agent and wherein said foam is reduced in weight between 10 and 80%.

27. A method according to claim 1, wherein said hot melt adhesive is applied to said thermoplastic heel pad blank at a temperature of between 370° F. and 470° F.

28. A method according to claim 1, wherein said pattern mold is maintained at a temperature of between 65° F. and 85° F.

29. A method according to claim 1, wherein the time for completing steps (b), (c) and (d) is between 10 and 20 seconds.

30. A method according to claim 1, wherein said hot melt adhesive comprises polyamide or polyester resins.

31. A method according to claim 1, wherein said carpeting contains polypropylene face fibers.

32. A process for forming a carpet-bonded and patterned thermoplastic region of a carpet structure comprising simultaneously adhesively bonding a nonpatterned thermoplastic blank to a region of a carpet structure and patterning said nonpatterned blank, said nonpatterned blank having a uniform layer of liquid hot melt adhesive applied to the back surface thereof and whereby said carpet-bonded and patterned thermoplastic region is formed using a patterned mold.

33. A process as in claim 32 utilizing a pattern mold and further comprising the step of applying uniform pressure to said nonpatterned thermoplastic blank in said carpet region against said pattern mold so as to effect said simultaneous bonding and patterning thereof.

34. A process as in claim 33 utilizing a hot melt adhesive.

35. A process as in claim 33 further comprising heating said pattern mold.

* * * * *

UNITED STATES PATENT AND TRADEMARK OFFICE
CERTIFICATE OF CORRECTION

PATENT NO. : 4,835,030

DATED : May 30, 1989

INVENTOR(S) : William H. Squier and Dennis E. Hair

It is certified that error appears in the above-identified patent and that said Letters Patent is hereby corrected as shown below:

Column 1, line 61, the word "o" should be --of--. Column 6, line 19, "fur&her" should be --further--.

Signed and Sealed this

Thirteenth Day of February, 1990

Attest:

JEFFREY M. SAMUELS

*Attesting Officer*    *Acting Commissioner of Patents and Trademarks*